US008270342B2

(12) United States Patent
Yang et al.

(10) Patent No.: US 8,270,342 B2
(45) Date of Patent: Sep. 18, 2012

(54) AVOIDING BEACON CONFLICTS IN MULTI-RADIO PLATFORMS

(75) Inventors: Xue Yang, Arcadia, CA (US); Hsin-Yuo Liu, San Jose, CA (US); Mathijs C. Walma, Hillsboro, OR (US); Shlomo Avital, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 12/456,888

(22) Filed: Jun. 24, 2009

(65) Prior Publication Data

US 2010/0329230 A1 Dec. 30, 2010

(51) Int. Cl.
*H04B 7/212* (2006.01)
*H04W 4/00* (2009.01)
*H04J 3/06* (2006.01)

(52) U.S. Cl. ........ 370/324; 370/338; 370/350; 370/503; 370/509; 370/512

(58) Field of Classification Search .................. 370/345, 370/329, 324, 338, 350, 503, 509, 512
See application file for complete search history.

(56) References Cited

U.S. PATENT DOCUMENTS

| 7,768,981 | B1 * | 8/2010 | Donovan et al. ............... 370/338 |
| 8,005,032 | B2 * | 8/2011 | Wang et al. .................... 370/311 |
| 2005/0233789 | A1 * | 10/2005 | Maekawa ........................ 463/1 |
| 2008/0002616 | A1 * | 1/2008 | Stahl et al. ..................... 370/329 |
| 2008/0227488 | A1 | 9/2008 | Zhu et al. |
| 2008/0232339 | A1 | 9/2008 | Yang et al. |
| 2008/0247367 | A1 | 10/2008 | Yang et al. |
| 2008/0310391 | A1 * | 12/2008 | Schneidman et al. ......... 370/349 |
| 2009/0086712 | A1 | 4/2009 | Liu et al. |
| 2009/0147768 | A1 * | 6/2009 | Ji et al. ........................... 370/350 |
| 2009/0156165 | A1 * | 6/2009 | Raghothaman et al. ....... 455/411 |
| 2010/0296495 | A1 * | 11/2010 | Iino et al. ....................... 370/338 |

FOREIGN PATENT DOCUMENTS

WO WO-2011005351 A2 1/2011

OTHER PUBLICATIONS

"European Application Serial No. 10797476.8, Office Action mailed Jan. 31, 2012", 2 pgs.

* cited by examiner

*Primary Examiner* — Huy D Vu
*Assistant Examiner* — Brandon Renner
(74) *Attorney, Agent, or Firm* — Schwegman, Lundberg & Woessner, P.A.

(57) ABSTRACT

In a multi-radio platform that operates in two networks, both the announced beacon intervals and the actual beacon intervals in one network may be periodically increased and decreased in defined amounts so that the beacons will not overlap scheduled communications with the other network. The determination of how much and how often to adjust these beacon intervals may be based, at least partially, on the minimum increments in which the beacons intervals are permitted to be adjusted, and on the scheduled communications intervals of the other network.

19 Claims, 6 Drawing Sheets

AVOIDING BEACON CONFLICTS IN MULTI-RADIO PLATFORMS

BACKGROUND

Multi-radio platforms (MRP) are becoming more common, in which a single wireless device is able to communicate in different networks using different protocols. One example is a device that can communicate in a WiMAX network and also communicate in a WiFi network, as long as the device's communications in one network don't interfere with the device's communications in the other network. The MRP may communicate at different regularly scheduled intervals in each network, intervals which unfortunately may not be compatible with each other. For example, a WiFi network controller may transmit beacons at predicable intervals to synchronize network timing, announce queued-up traffic for the devices in that network, and/or announce other information that the devices in that network need to know. A WiMAX network may schedule the MRP for a virtual 'sleep mode' at its own regularly scheduled intervals, thus allowing the MRP a period of silence in the WiMAX network so the MRP may use that time to transmit its WiFi beacons without causing inter-network interference. Predictable beacon intervals are important because they allow the various client devices to go into a power-saving non-operational mode when they are idle and only wake up long enough to listen for the next beacon.

Unfortunately, different types of networks may use communication intervals that are not integer multiples of each other, so that the beacons and beacon-listening periods in the WiFi network may not be in sync with the sleep periods in the WiMAX network. Even if the WiMAX sleep periods and WiFi beacons start out at the same time, the out-of-sync timing between the two networks may eventually cause the WiFi beacons to fall outside the WiMAX sleep periods, resulting in possible inter-network interference between the two networks.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
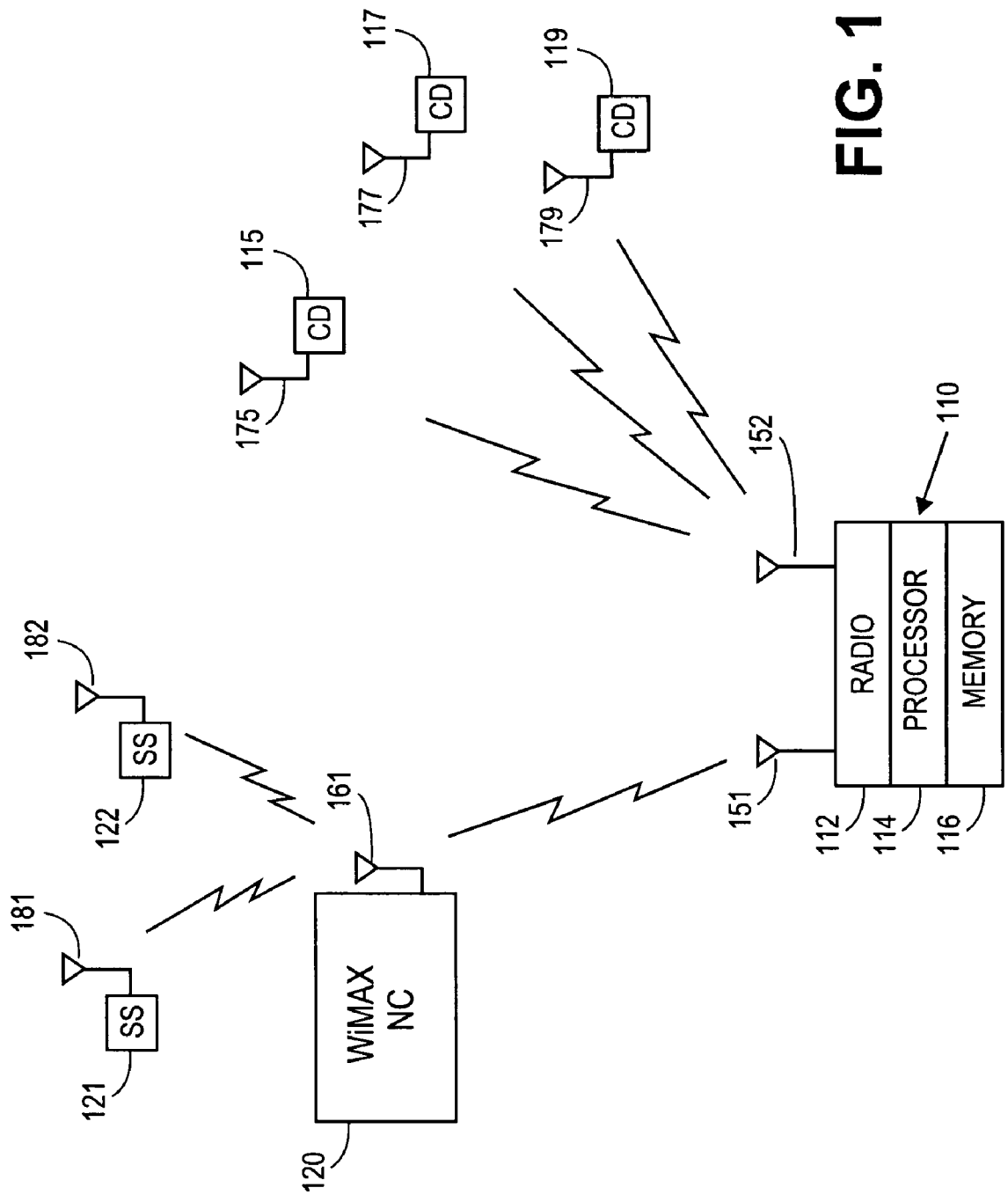
FIG. 1 shows a multi radio platform participating in two networks, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of the indicated elements are being referred to, and does not imply that the elements so described must be in a given sequence, either temporally, spatially, in ranking, or in any other manner, nor does it imply that the described elements must be completely identical (for example, first and second time intervals may have a different duration).

Various embodiments of the invention may be implemented in one, or any combination, of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. A wireless device may comprise at least one antenna, at least one radio, and at least one processor, where the radio transmits signals through the antenna that represent data and receives signals through the antenna that represent data, while the processor may process the data to be transmitted and the data that has been received. The processor may also process other data which is neither transmitted nor received.

The term "network controller" (NC) is used herein to describe a wireless communications device that schedules wireless communications with other devices associated with it in the network. The term "client device" (CD) is used herein to describe a wireless communications device that is associated with the NC, and whose communications with the NC may be largely scheduled by the NC. The term "associated" indicates that the CD has provided sufficient information about itself that the NC is aware of the existence of the CD, and that the NC and CD have agreed on enough protocols that they can communicate with each other. Other terms may be used to describe an NC's, such as but not limited to "access point" (AP), "base station" (BS), "control point" (CP), etc. Other terms may be used to describe a CD, such as but not limited to subscriber station (SS), mobile station (MS), STA, DEV, etc. The terms used in this document are intended to encompass all such alternative labels for these functional devices.

For the purposes of this document, an 'announced beacon interval' (announced BI) is the interval of time between the start of two successive beacons, as that time was most recently announced to the CDs by the NC. This is the beacon interval that the CDs will use to determine when to listen for a beacon, and must be an integer multiple of a time unit (TU) that is defined for that network. The announced BI may or may not be the same as the interval between actual beacons. A 'nominal beacon interval' is the theoretical beacon interval that is equal to the interval between the repeated periods of idle time for this device in the other network, as that idle time was determined in the other network. In some embodiments, this period of idle time is designated as a sleep period in the other network, but is used instead to transmit beacons in this network. An 'actual beacon interval' is the interval of time between the start of two successive beacons, as those beacons are actually transmitted. This interval does not have to be an integer multiple of the TU, and may be different than the announced beacon interval and/or different than the nominal beacon interval.

In various embodiments, in a multi-radio platform (MRP) the announced BI and/or the actual BI in a network may be periodically adjusted so that the difference between the actual BI and the nominal BI remains within a predefined range. This permits the beacons transmitted by an MRP in a first network to remain within a repeating period of idle time for the MRP as designated in a second network. In some embodiments this repeating period of idle time may be designated as a sleep period by the network controller in the second network, but may instead be used for communicating beacons by the MRP in the first network. When the announced BIs (and therefore the start of the time periods during which the client devices are listening for beacons) are constrained to integer multiples of a particular unit of time, and that constraint would eventually cause the beacons of the first network to gradually migrate out of the idle periods of the second network, this adjustment may be of a cyclical nature, alternately being less than and more than the desired nominal beacon interval, so as to keep the transmitted beacons within the periods of idle time.

For example, this situation occurs when an MRP operates as a network controller in a WiFi network in which the announced BIs must be integer multiples of 1024 usec (microseconds), and the MRP also operates as a subscriber station in a WiMAX network in which the MRP's sleep interval (the interval between designated sleep periods) must be an integer multiple of the 5 msec (millisecond) WiMAX frames. Without the cyclical adjustment, the timing of the beacons would eventually migrate through the WiMAX frames until the beacons were outside the sleep interval and therefore might interfere with the WiMAX communications.

FIG. 1 shows a multi radio platform (MRP) participating in two networks, according to an embodiment of the invention. For ease and clarity of description, a WiFi network and a WiMAX network are described in this and other examples, but the embodiments of the inventions are not limited to these two particular types of networks. In this example, the illustrated MRP 110 may operate as a network controller in a WiFi network, scheduling much of the communications for client devices 115, 117, and 119. MRP 110 may also operate as a subscriber station in a WiMAX network, having much of its communications in the WiMAX network scheduled by network controller 120, which also may schedule communications for WiMAX subscriber stations 121 and 122. Each of the devices in this example have at least one antenna (151, 152, 161, 175, 177, 179, 181, and 182) for wireless communications, but any of these devices may have more than one antenna. MRP 110 is shown as having different antennas (151, 152) for the WiFi and WiMAX networks, but some embodiments may use the same antenna(s) for both networks. MRP 110 is also shown with at least one radio 112, at least one processor 114, and at least one memory 116. The term "multi-radio" platform does not imply that a separate radio (or separate groups of radios) must be used for each network—in some embodiments a single radio (or single group of radios) may be dynamically reconfigurable to operate in either network, while other embodiments may partially or fully use different radio(s) for each network.

In operation, the WiMAX network controller 120 may schedule WiMAX network operations with a repetitive frame length of 5 msec. Although the exact timing of all communications within that frame may not be entirely predictable, the WiMAX controller may schedule sleep periods for MRP 120 at regular intervals compatible with the frame timing. For example, each sleep period may occur at integer multiples of the 5 msec frame period (once every x number of frames), or each sleep period may occur at integer divisors of the frame period (y number of sleep periods per frame). A subscriber station in a WiMAX network might normally use the scheduled sleep period to place itself in a low-power non-operational mode to save battery power. But in this example, the subscriber station is also a network controller in the WiFi network. Since it knows it will not receive any communications in the WiMAX network during these scheduled sleep periods, instead of sleeping it can use these periods to transmit beacons to its WiFi client devices, without the risk of having to deal with simultaneous communications in both networks.

At least some of these beacons may contain a value defining the announced BI for the subsequent beacons. Because of the way the announced BI is expressed in a beacon, the announced BI may be limited to integer multiples of a particular time unit (TU). In some embodiments a TU=1,024 usec, but other embodiments may be broad enough to accommodate TU's having a size other than 1,024 usec.

Although the MRP may intend to transmit the next actual beacon at the time indicated by the actual BI, channel conditions may prevent the next beacon from being transmitted at the intended time. For example, another device may be transmitting on the same frequency at the intended beacon time, making the channel unavailable. This could be any of various types of devices, such as but not limited to: 1) a device in another nearby WiFi network, 2) a non-network device that emits RF energy at the same frequency, such as a microwave oven, 3) a radar device whose transmissions take priority over the network transmissions, 4) etc. For this reason, the actual transmission of the beacon may be delayed from its intended transmission time. Since some of the client devices may have awakened from their low-power sleep mode just to hear this beacon, and will return to sleep mode after hearing it, this delay can cause excessive battery usage in those client devices if it lasts for very long. To prevent this from happening, the network protocols or other operational parameters may specify a maximum delay in the actual beacon transmission time from its announced time, so that these devices can return to sleep mode if they don't hear the beacon within that maximum delay time. The next period of waking up and listening for the beacon may take place at its originally scheduled time, regardless of whether the last beacon was on time, delayed, or not heard at all. This flexibility in when a beacon may be transmitted, as permitted by the maximum delay time, may be used to advantage in the various embodiments of the invention by deliberately making the actual BIs different than the announced BIs. Note: the actual BI, as that term is used in this document, refers to the time the network controller intends to transmit the beacon, without consideration of any channel access delays that may unintentionally delay that individual beacon transmission. However, the actual BI may intentionally be made different than the nominal or announced BIs.

Figure 2:
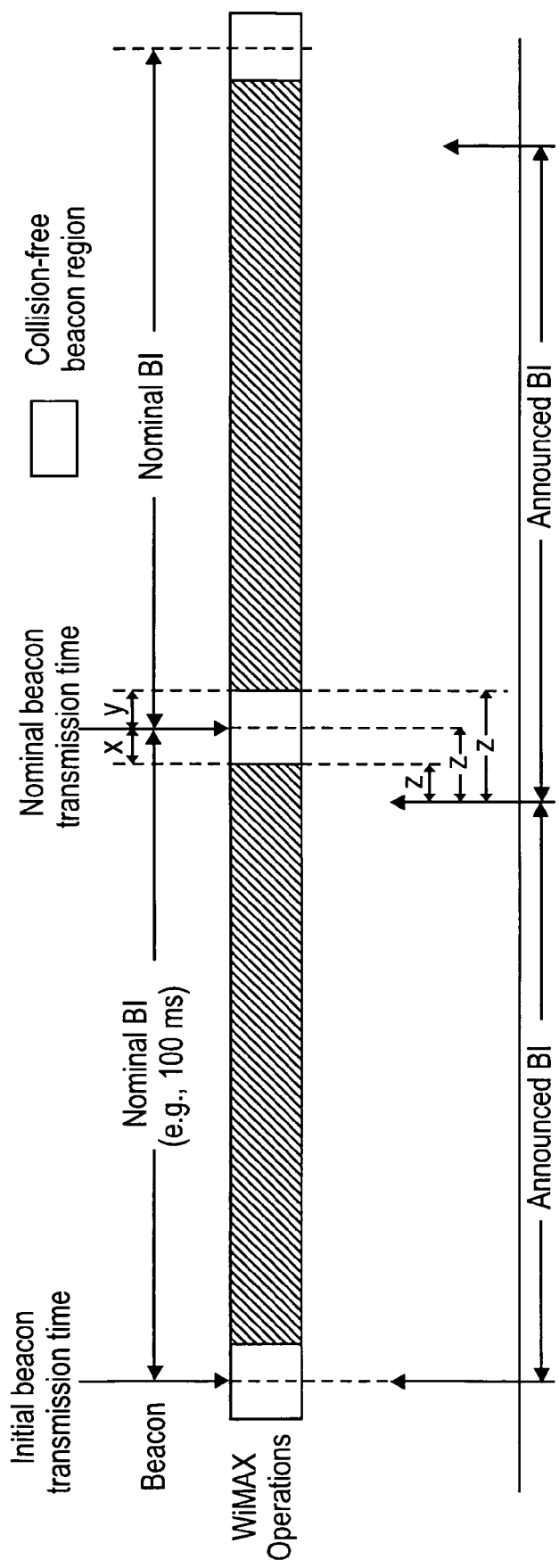
FIG. 2 shows a timing diagram of beacon intervals, according to an embodiment of the invention.

FIG. 2 shows a timing diagram of beacon intervals, according to an embodiment of the invention. In the illustrated diagram, the horizontal axis represents time, and the horizontal bar represents WiMAX operations that may involve MRP 110. The shaded portions of the horizontal bar represent times during which the MRP may have communications within the WiMAX network. Although the MRP may find irregular periods of time during the shaded portions in which it can communicate in the WiFi network, the clear portions of the horizontal bar represent the dependable repetitive times during which the MRP knows it will not have scheduled communications in the WiMAX network because those periods have been designated as idle time for the MRP in the WiMAX network. Within this document, these periods may be designated as 'collision-free' time periods, because MRP communications in the WiFi network should not collide with MRP communications in the WiMAX network, since WiMAX communications are not scheduled during that time period. The term 'collision-free' time period is also intended to cover this same concept in networks other than the WiFi and/or WiMAX networks used in these examples. In some embodiments the collision-free time period may be a designated sleep period, in which the WiMAX controller will not schedule communications for the MRP because it assumes the MRP is in a non-operational low-power mode. But regardless of the designation, the clear portions indicate periods that repeat at predictable regular intervals, periods during which the MRP is certain that it will not have scheduled communications within the WiMAX network. These are the periods the MRP may use to transmit its WiFi beacons without the risk of having conflicting WiMAX traffic.

The example of FIG. 2 shows these periods of idle time occurring at intervals of 100 msec, although other values may be used. Since this is an integer multiple of the 5 msec WiMAX frame rate, this interval could theoretically continue indefinitely and stay synchronized with the WiMAX frame rate, and for that reason may be a desirable value for a nominal BI. However, to be compatible with the WiFi requirements, the announced BI must be an integer multiple of the 1,024 usec TU, and 100 msec is not an integer multiple of a 1,024 msec. Based on these values, the announced BI and the nominal BI cannot be identical, at least not for any values that are practical. An announced BI of 97 TUs would be 99.328 msec, while an announced BI of 98 TUs would be 100.352 msec. Using either value continuously would eventually push the beacons out of the collision-free time period.

As stated previously, WiFi protocols permit the actual transmitted beacon to be delayed for up to a maximum time period to accommodate unpredicted channel conditions. This permissible delay time may allow the actual beacon to be deliberately delayed from the announced beacon time, until the actual beacon is close enough to the nominal beacon time that the beacon falls within the idle time window, but is still within the permissible maximum delay time. FIG. 2 shows three delay values, each labeled z, each of which would move the beacon into the nominal beacon time window. However, with each successive beacon, the announced beacon time will move farther away from the nominal beacon time, until this permissible delay is not enough to make up the difference.

Figure 3A:
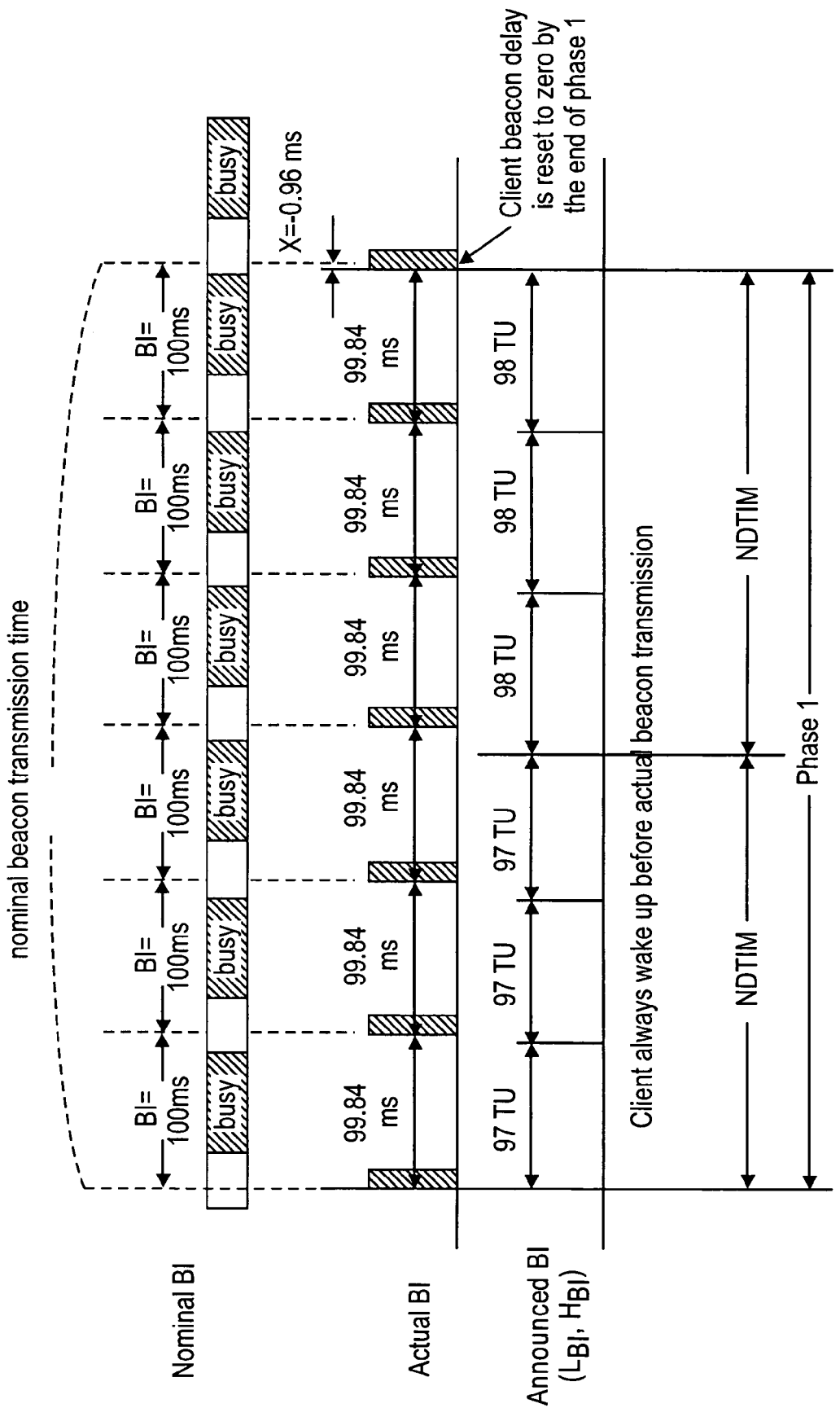
FIGS. 3A, 3B show a timing diagram of a method of adjusting announced and/or actual beacon intervals, according to an embodiment of the invention.
Figure 3B:
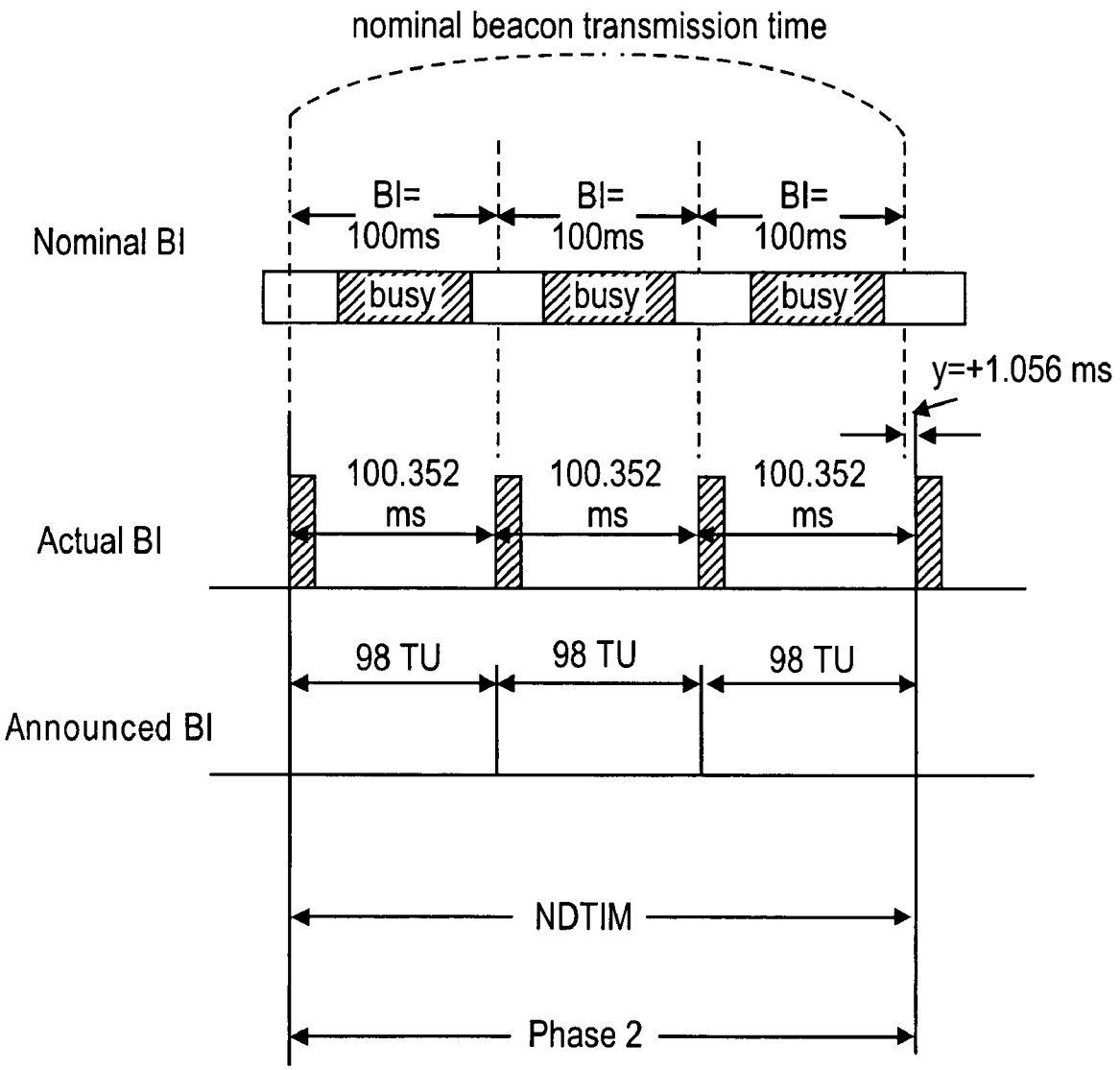

FIGS. 3A, 3B show a timing diagram of a method of adjusting announced and/or actual beacon intervals, according to an embodiment of the invention. Particular values are assumed in this example for clarity of illustration, but other values may also be used. In the example that begins in FIG. 3A, a nominal BI of 100 msec is assumed. This nominal BI value may be determined, for example, by the WiMAX network controller establishing a repetitive sleep period for the MRP every 100 msec. The announced BI has two values, to be employed at different parts in the communications sequence. The lower value of announced BI, designated as $L_{BI}$, may be the permissible value of announced BI that is less than, and closest to, the nominal BI. The higher value of announced BI, designated as $H_{BI}$, may be the permissible value of announced BI that is greater than, and closest to, the nominal BI. In this example, $L_{BI}$ would be 97 TUs (99.328 msec) and $H_{BI}$ would be 98 TUs (100.352 msec), as those are the closest permissible values of announced BI to the 100 msec nominal BI.

NDTIM may also be used in the calculations. NDTIM indicates the number of announced BIs that must occur before the value of the announced BI can be changed. In this example, NDTIM=3, so the value of announced future BIs can only be changed in every third announced beacon. Other integer values of NDTIM, including the value of 1, may be used in other embodiments.

Phase 1, as shown here, includes enough NDTIMs so that $L_{BI}$ may be used for some of the announced BIs, $H_{BI}$ may be used for the remaining announced BIs, and at the end of Phase 1 the actual beacon time will match the announced beacon time. The illustrated example has the announced BI equal to $L_{BI}$ for one NDTIM, and equal to $H_{BI}$ for one NDTIM. However, although the announced BI and actual BI are in sync at the end of Phase 1, they may not be in sync with the nominal BI, with a difference of 0.96 msec in this example. Since the goal is to sync up both with nominal BI, Phase 2 may be used to achieve this goal.

FIG. 3B shows Phase 2, which immediately follows Phase 1 of FIG. 3A. The nominal BIs continue to be 100 msec, in keeping with the repetitive idle periods previously established by the WiMAX network. The size of the actual BIs and the announced BIs are adjusted to be the same value (which maintains their alignment with each other throughout Phase 2) and are set to at least overcome the difference between the nominal BI timing and actual BI timing that existed at the end of Phase 1. In the illustrated example, Phase 2 lasts for one NDTIM. Since the available values for the announced BIs may not allow them to be brought into alignment with the nominal BIs by the end of Phase 2, the value of the announced BIs may be selected to overshoot this goal. In this example, the difference of −0.96 msec during Phase 1 is followed by a difference of +1.056 msec during Phase 2. Following a single Phase 1 with a single Phase 2 would give a cumulative total of −0.96+1.056=+0.096 msec, which still doesn't bring the announced or actual BI into alignment with the nominal BI. However, with carefully chosen parameters, alternating Phase 1 and Phase 2 a given number of times can bring the announced and actual BIs into alignment with the nominal BI.

Figure 4:
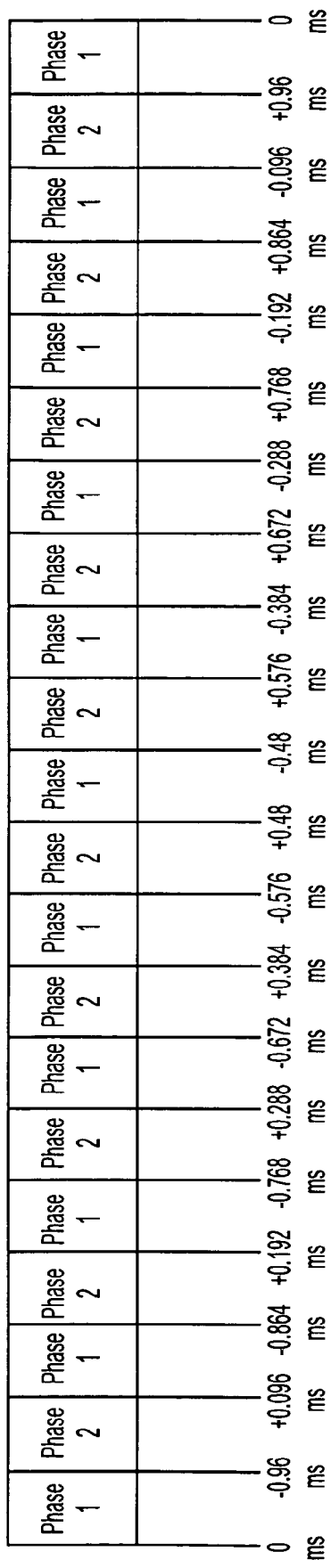
FIG. 4 shows a timing diagram of a series of alternating Phase 1-Phase 2 sets of beacon intervals, according to an embodiment of the invention.

FIG. 4 shows a timing diagram of a series of alternating Phase 1-Phase 2 sets of beacon intervals, according to an embodiment of the invention. The illustrated example, which uses the timing values shown in FIGS. 3A and 3B, shows eleven Phase 1's alternating with ten Phase 2's, with the nominal BIs achieving alignment with the actual and announced BIs at the end of this 21-phase series. This series achieves three notable goals: 1) every actual beacon falls within the idle time window defined by the other network, 2) the actual BI schedule remains close enough to the announced BI schedule so that the WiFi client devices won't have to wait more than the permissible wait time for the actual beacon, and 3) the alignment of nominal, announced, and actual BIs occurs at regular repeating points, so the series can continue indefinitely without further adjustment.

The process just described can be guided by a few simple rules, which can be made more clear by referring to FIGS. 3A and 3B:

1) The value of the announced BI is an integer multiple of TU, and at different times in the process is either the integer multiple of TU that is immediately below ($L_{BI}$) the nominal BI, or the integer multiple of TU that is immediately above ($H_{BI}$) the nominal BI.

2) In Phase 1 the actual BI is the average of $L_{BI}$ and $H_{BI}$. Since the values of $L_{BI}$ and $H_{BI}$ are only one TU apart, the difference between the announced BI and the actual BI is 0.5 TUs in Phase 1, regardless of whether $L_{BI}$ or $H_{BI}$ is being used at the time for the announced BI.

3) In Phase 2, the announced BI and the actual BI are both set to either $L_{BI}$ or $H_{BI}$, whichever is closer in value to the nominal BI.

4) The value of the announced BI can only be changed (from $L_{BI}$ to $H_{BI}$ or vice-versa) at NDTIM intervals of the announced BIs, since that is how often the announced BI is announced to the client devices.

5) Since the announced BI may be changed every NDTIM multiple of the announced BIs, the delay between the expected beacon time and the actual beacon time may be limited to no more than NDTIM*TU/2, by changing the value of the announced BI as appropriate at these NDTIM intervals.

6) During the first NDTIM period of Phase 1, the accumulated difference between the announced beacon time and the actual beacon time will continue to increase. During the second NDTIM period of Phase 1, that accumulated difference will decrease until it reaches 0 at the end of the second NDTIM period. This difference will remain at 0 throughout Phase 2, since announced BI and actual BI will be the same during Phase 2.

Using the previously described values of nominal BI=100 msec, TU=1024 usec, NDTIM=3, it can be shown that:

1) the announced BI is either 99.328 msec ($L_{BI}$=97 TUs), or 100.352 msec ($H_{BI}$=98 TUs).

2) the difference between the announced BI and the actual BI is 0.512 msec (0.5 TUs) in Phase 1, and is 0.0 msec in Phase 2.

3) the cumulative difference between the announced beacon time and the actual beacon time can be held to no more than 1.536 msec (0.512×3) during Phase 1. This indicates the maximum amount of time the client devices should have to wait for a beacon (excluding medium access time for the network controller, which may be factored in separately). By the end of Phase 1, the announced beacon time and the actual beacon time should coincide.

Figure 5:
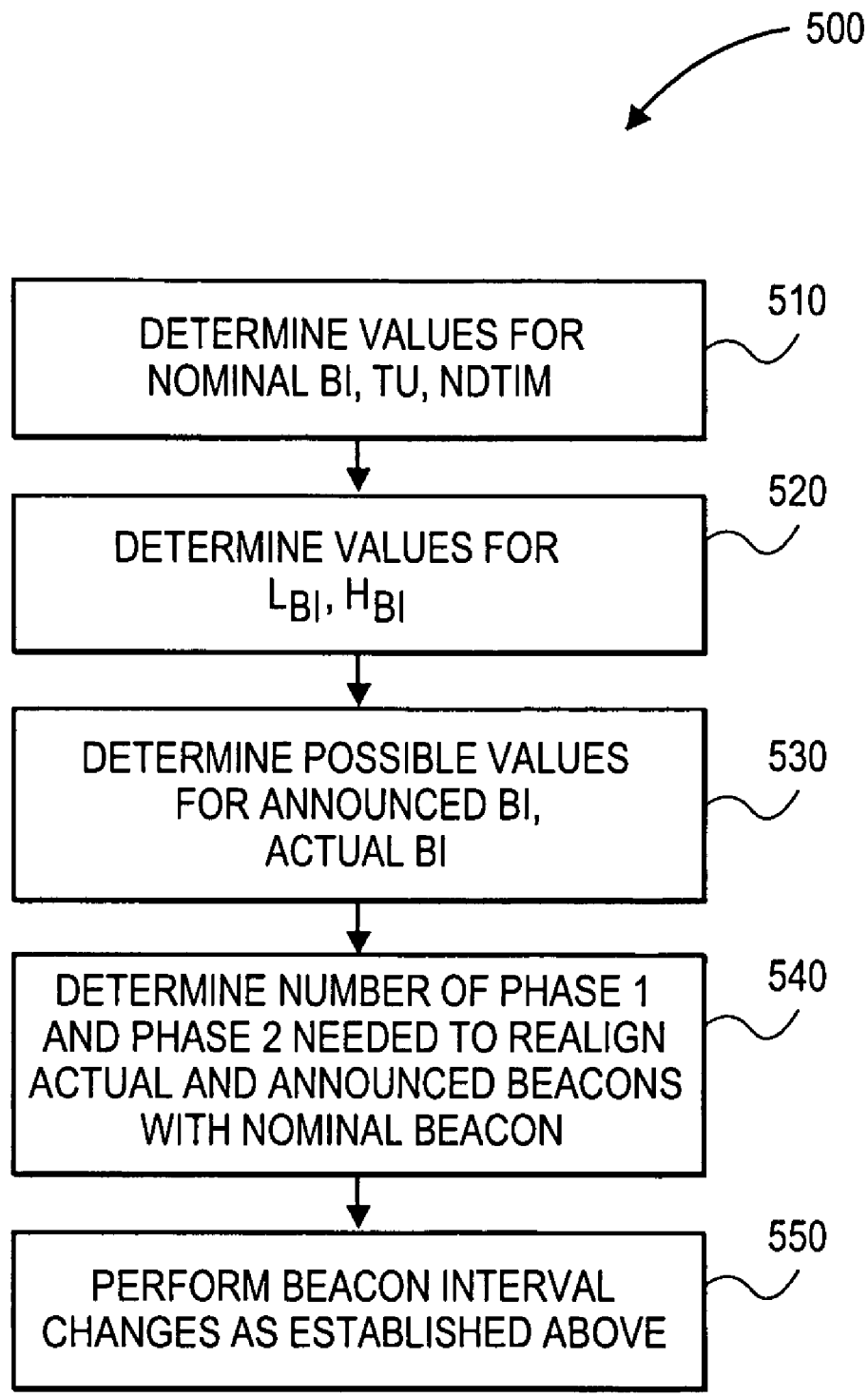
FIG. 5 shows a flow diagram of a method of adjusting beacon intervals, according to an embodiment of the invention.

FIG. 5 shows a flow diagram of a method of adjusting beacon intervals, according to an embodiment of the invention. In flow diagram 500, at 510 the values for various initial parameters such as nominal BI, TU, and NDTIM may be determined. In some embodiments, these parameters may be dictated by outside circumstances, and the network controller may just use the parameters provided to it. At 520, values for $L_{BI}$ and $H_{BI}$ may be determined. These may be derived based on the values of nominal BI and TU that were determined at 510. At 530, the various possible values for announced BI and actual BI may be determined. Each of these may have more than one possible value, to be used at different times during the process, but each of those possible values may be determined here.

Based on the parameters determined thus far, at 540 it may be determined how many alternating Phase 1's and Phase 2's are needed to bring the start of a nominal BI, the start of an announced BI, and the start of an actual BI into alignment with each other, which will complete a cycle. In some operations, there may be an equal number of Phase 1's and Phase 2's in this cycle, but in other operations there may be one more Phase 1 than Phase 2 (as in the example of FIG. 4).

At 550 the actual communications may be performed with the beacon intervals as determined above. Assuming a cycle starts with these three BI's in alignment, and ends with them in alignment again, the cycle determined at 550 may theoretically be repeated indefinitely without further adjustment. Of course, other changes in timing, brought about by factors not discussed here, may require new parameters, and a new cycle, to be determined.

As can be seen in the preceding example, each combination of one Phase 1 and one Phase 2 may consist of three predetermined periods of time, each consisting of enough announced BIs to occupy one NDTIM. In the first predetermined period of time, the announced BI (which must be an integer multiple of a TU) is set to one of the two chosen values that are immediately below and above the nominal BI. For the second predetermined period of time the announced BI is set to the other of those two values. The actual BI is set to the average of those two chosen values for both the first and second predetermined periods of time, which together represent Phase 1. In the third predetermined period of time, which represents Phase 2, both the announced BI and the actual BI are set to whichever of the first and second chosen values is closest in value to the nominal BI. Phase 1 and Phase 2 may then be repeated multiple times until the nominal BI, the actual BI, and the announced BI all start at the same time again, although the final Phase 2 may be omitted if necessary to achieve this goal.

In this manner, the actual WiFi beacons will be transmitted during the available collision-free periods determined by the WiMAX network, the WiFi devices will not have to wait for an excessive time period to hear each beacon even though the actual beacons do not occur at the announced times, and the entire process can be repeated endlessly without having to reset the timing parameters that achieve these goals. It may be assumed that the first nominal BI, the first announced BI, and the first actual BI all begin at the same point in a collision-free period, and that after the necessary number of cycles, they will all begin again at the same point in a collision-free period because of the values adopted for the various beacon intervals.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
   following a communications schedule in a first wireless network, the communications schedule including collision-free time periods that occur at repeating regular intervals;
   determining a value for a nominal beacon interval equal to the repeating regular interval;
   determining first and second beacon intervals to announce to client devices in a second wireless network, each of the first and second beacon intervals being an integer multiple of a predetermined time unit that are closest to the nominal beacon interval, one of the first or second beacon interval being less than the nominal beacon interval, the other of the first or second beacon interval being greater than the nominal beacon interval;

determining third and fourth beacon intervals for transmitting beacons to the client devices, one of the third or fourth beacon interval being an average of the first and second beacon intervals, the other of the third or fourth beacon interval be equal to one of the first and second beacon intervals that is closer in value to the nominal beacon interval;

transmitting, to the client devices, a value for the first beacon interval to announce the first beacon interval;

transmitting the beacons to the client devices at the third beacon interval for a first predetermined period of time;

transmitting, to the client devices, a value for the second beacon interval to announce the second beacon interval;

transmitting the beacons to the client devices at the third beacon interval for a second predetermined period of time, the first and second predetermined periods of time being selected so that the transmitted beacons will be in sync with the announced second beacon interval after the second predetermined period of time;

transmitting, to the client devices, a value for the fourth beacon interval to announce the fourth beacon interval; and transmitting the beacons to the client devices at the fourth beacon interval for a third predetermined period of time, the third predetermined period of time selected so that the announced fourth beacon interval will be in sync with the nominal beacon interval after the third predetermined period;

wherein each of the beacons transmitted at the third and fourth beacon intervals occurs during the collision-free time periods.

2. The method of claim 1, wherein a difference between each beacon transmission time and a nearest beginning of the first beacon interval is less than a particular amount.

3. The method of claim 1, wherein the predetermined time unit is equal to 1,024 microseconds.

4. The method of claim 1, wherein the first, second, and third predetermined periods of time are each equal to a minimum permissible time at which values for the first or second beacon intervals may be transmitted to the client devices.

5. The method of claim 1, wherein the first network is a WiMAX network.

6. The method of claim 1, wherein the second network is a WiFi network.

7. The method of claim 1, wherein the collision-free period of time has been designated as a sleep period by a network controller in the first network.

8. An apparatus comprising
a wireless communications device having at least one processor, at least one memory, and at least one radio, the device to operate as a client in a first network and as a network controller in a second network, the device to:
determine a value for a nominal beacon interval equal to repeating regular intervals between designated collision-free time periods in the first network;
determine first and second beacon intervals to announce to client devices in a second wireless network, each of the first and second beacon intervals being an integer multiple of a predetermined time unit that are closest to the nominal beacon interval, one of the first or second beacon interval being less than the nominal beacon interval, the other of the first or second beacon interval being greater than the nominal beacon interval;
determine third and fourth beacon intervals for transmitting beacons to the client devices, one of the third or fourth beacon interval being an average of the first and second beacon intervals, the other of the third or fourth beacon interval be equal to one of the first and second beacon intervals that is closer in value to the nominal beacon interval;
transmit a value for the first beacon interval to the client devices to announce the first beacon interval;
transmit the beacons to the client devices at the third beacon interval for a first predetermined period of time;
transmit a value for the second beacon interval to the client devices to announce the second beacon interval;
transmit the beacons to the client devices at the third beacon interval for a second predetermined period of time, the first and second predetermined periods of time being selected so that the transmitted beacons will be in sync with the announced second beacon interval after the second predetermined period of time;
transmit a value for the fourth beacon interval to the client devices to announce the fourth beacon interval; and
transmit the beacons to the client devices at the fourth beacon interval for a third predetermined period of time, the third predetermined period of time selected so that the announced fourth beacon interval will be in sync with the nominal beacon interval after the third predetermined period;
wherein each of the transmitted beacons is to be transmitted during the designated collision-free time period.

9. The apparatus of claim 8, wherein the predetermined time unit is to be equal to 1,024 microseconds.

10. The apparatus of claim 8, wherein the first, second, and third predetermined periods of time are each to be equal to a minimum permissible period of time at which values for the first or second beacon intervals may be transmitted to the client devices.

11. The apparatus of claim 8, wherein the first network is to be a WiMAX network.

12. The apparatus of claim 8, wherein the second network is to be a WiFi network.

13. The apparatus of claim 8, wherein the wireless communications device comprises multiple antennas.

14. An article comprising a non-transitory computer-readable storage medium that contains instructions, which when executed by one or more processors result in performing operations comprising:
identifying collision-free time periods for a communications schedule in a first wireless network, the collision-free time periods occurring at repeating regular intervals;
determining a value for a nominal beacon interval equal to the repeating regular interval;
determining first and second beacon intervals to announce to client devices in a second wireless network, each of the first and second beacon intervals being an integer multiple of a predetermined time unit that are closest to the nominal beacon interval, one of the first or second beacon interval being less than the nominal beacon interval, the other of the first or second beacon interval being greater than the nominal beacon interval;
determining third and fourth beacon intervals for transmitting beacons to the client devices, one of the third or fourth beacon interval being an average of the first and second beacon intervals, the other of the third or fourth beacon interval be equal to one of the first and second beacon intervals that is closer in value to the nominal beacon interval;

transmitting, to the client devices, a value for the first beacon interval to announce the first beacon interval;

transmitting the beacons to the client devices at the third beacon interval for a first predetermined period of time;

transmitting, to the client devices, a value for the second beacon interval to announce the second beacon interval;

transmitting the beacons to the client devices at the third beacon interval for a second predetermined period of time, the first and second predetermined periods of time being selected so that the transmitted beacons will be in sync with the announced second beacon interval after the second predetermined period of time;

transmitting, to the client devices, a value for the fourth beacon interval to announce the fourth beacon interval; and transmitting the beacons to the client devices at the fourth beacon interval for a third predetermined period of time, the third predetermined period of time selected so that the announced fourth beacon interval will be in sync with the nominal beacon interval after the third predetermined period;

wherein each of the beacons transmitted at the third and fourth beacon intervals occurs during the collision-free time periods.

15. The article of claim 14, wherein a difference between each beacon transmission time and a nearest beginning of the first interval is less than a particular amount.

16. The article of claim 14, wherein the first, second, and third predetermined periods of time are each equal to a minimum permissible time at which values for the first or second beacon intervals may be transmitted to the client devices.

17. The article of claim 14, wherein the first network is a WiMAX network.

18. The article of claim 14, wherein the second network is a WiFi network.

19. The article of claim 14, wherein the collision-free period of time has been designated as a sleep period by a network controller in the first network.

* * * * *